US009924392B2

(12) United States Patent
Côté et al.

(10) Patent No.: US 9,924,392 B2
(45) Date of Patent: Mar. 20, 2018

(54) SDN ORCHESTRATION AND OPTIMIZATION OF ANTENNAS AND FREQUENCIES IN RADIO ACCESS NETWORKS

(71) Applicant: Ciena Corporation, Hanover, MD (US)

(72) Inventors: David Côté, Gatineau (CA); Aung Htay, Alpharetta, GA (US); Roger Michael Elbaz, Dawsonville, GA (US)

(73) Assignee: Cienna Corporation, Hanover, MD (US)

( * ) Notice: Subject to any disclaimer, the term of this patent is extended or adjusted under 35 U.S.C. 154(b) by 55 days.

(21) Appl. No.: 14/859,642

(22) Filed: Sep. 21, 2015

(65) Prior Publication Data
US 2017/0086208 A1    Mar. 23, 2017

(51) Int. Cl.
H04W 72/10 (2009.01)
H04W 24/08 (2009.01)
H04W 76/04 (2009.01)

(52) U.S. Cl.
CPC .......... *H04W 24/08* (2013.01); *H04W 76/04* (2013.01)

(58) Field of Classification Search
None
See application file for complete search history.

(56) References Cited

U.S. PATENT DOCUMENTS

| 8,224,289 B2 * | 7/2012 | Poltorak | H04M 15/00 455/405 |
| 2008/0175167 A1 * | 7/2008 | Satyanarayanan | H04L 41/147 370/254 |
| 2008/0201748 A1 * | 8/2008 | Hasek | H04N 7/17309 725/98 |
| 2008/0225710 A1 * | 9/2008 | Raja | G06F 9/505 370/230.1 |
| 2010/0029274 A1 * | 2/2010 | Deshpande | H04J 11/0093 455/435.3 |
| 2014/0092765 A1 | 4/2014 | Agarwal et al. | |
| 2014/0126410 A1 * | 5/2014 | Agarwal | H04W 24/02 370/252 |
| 2014/0133456 A1 | 5/2014 | Donepudi et al. | |
| 2014/0226467 A1 | 8/2014 | Park | |
| 2015/0055623 A1 | 2/2015 | Li et al. | |
| 2015/0271541 A1 * | 9/2015 | Gonder | H04N 21/278 725/134 |
| 2016/0164992 A1 * | 6/2016 | Prasad | H04L 67/2814 709/217 |
| 2016/0330083 A1 * | 11/2016 | Djukic | H04L 41/5006 |

* cited by examiner

*Primary Examiner* — Noel Beharry
*Assistant Examiner* — Ruihua Zhang
(74) *Attorney, Agent, or Firm* — Clements Bernard Walker PLLC; Christopher L. Bernard; Lawrence A. Baratta, Jr.

(57) ABSTRACT

Systems and methods for Software Defined Networking (SDN) orchestration of antennas and frequencies in a heterogeneous Radio Access Network (RAN) include maintaining status of a plurality of devices connected to the heterogeneous RAN; determining whether to upgrade connections of a first subset of the plurality of devices; determining whether to downgrade connections of a second subset of the plurality of devices; and providing instructions to the heterogeneous RAN for the first subset and the second subset. The systems and methods enable enforcement of business-aware prioritization on the heterogeneous RAN.

18 Claims, 7 Drawing Sheets

SDN ORCHESTRATION AND OPTIMIZATION OF ANTENNAS AND FREQUENCIES IN RADIO ACCESS NETWORKS

FIELD OF THE DISCLOSURE

The present disclosure generally relates to networking systems and methods. More particularly, the present disclosure relates to Software Defined Networking (SDN) orchestration and optimization of antennas and frequencies in heterogeneous Radio Access Networks (RANs).

BACKGROUND OF THE DISCLOSURE

As mobile devices, Internet of Things (IoT), machine to machine (M2M) connectivity (collectively referred to as mobile devices herein), and the like continue to proliferate, demands continue to increase for wireless spectrum. According to the Universal Mobile Telecommunications System (UMTS) forum (www.umts-forum.org), the worldwide aggregate mobile traffic demand is forecasted to be around 127 exabytes (EB) by 2020. Wireless communication, e.g., data, phone calls, and text messages, propagates over the air via Radio Frequency (RF). Because of the growing needs in wireless communications, there are many different frequencies, or bands of spectrum, that are deployed. As demands continue to grow, the need for additional spectrum grows as well. To accommodate the massive growth, wireless networks are moving towards heterogeneous RAN deployments with spectrum depth (communication over multiple frequencies), using a mixture of traditional cell towers augmented with so-called small cells including microcells, picocells, femtocells, and nanocells for next-generation networks in order to deliver the expected bandwidth demand.

While heterogeneous RANs assist in meeting increased demands, there is additional complexity. A mobile device connects to an access point (or cell, base station, etc.) at only one frequency at a time, but there are multiple possible antennas and frequencies. In the heterogeneous RAN, the access point can have a plurality of antennas, and there can be various access points for a mobile device at a given location. Conventionally, the choice of antenna and access point is left to individual mobile devices, i.e., a local decision which is made without global knowledge. With spectrum depth, the choice of frequency could also be left to the mobile device, but, again, this is a local decision which is made without global knowledge. With emerging heterogeneous RANs, the lack of centralized load-balancing and resource brokering based on a comprehensive network view can result in unpredictable network behavior.

BRIEF SUMMARY OF THE DISCLOSURE

In an exemplary embodiment, a method for orchestration of antennas and frequencies in a heterogeneous Radio Access Network (RAN) maintaining status of a plurality of devices connected to the heterogeneous RAN; determining whether to upgrade connections of a first subset of the plurality of devices; determining whether to downgrade connections of a second subset of the plurality of devices; and providing instructions to the heterogeneous RAN for the first subset and the second subset. The method can be implemented in one of i) a Software Defined Networking (SDN) application executed on one or more servers communicatively coupled to the heterogeneous RAN and ii) a Virtual Networking Function (VNF) executed on a backhaul network element communicatively coupled to the heterogeneous RAN. The heterogeneous RAN can include a plurality of towers and cell sites, each with one or more antennas and one or more frequencies, wherein the upgrade connections and the downgrade connections can include a change of one or more of an antenna, a frequency, and an access point in the heterogeneous RAN. The maintaining the status can include obtaining data from the plurality of devices, and one or more of obtaining data from backhaul network elements in the heterogeneous RAN and data from an external database.

Each of the plurality of devices initially chooses an antenna, frequency, and access point for accessing the heterogeneous RAN, maintaining compatibility with the heterogeneous RAN, and the upgrade connections and the downgrade connections can be used to rapidly move each of the plurality of devices to an optimal configuration, considering a global view of the heterogeneous RAN. The downgrade connections can be configured to lower or disconnect lower priority devices in favor of higher priority devices, wherein priority is customizable by an operator of the heterogeneous RAN. One of more devices of the plurality of devices can execute an application configured to provide the status and receive and implement the instructions. The method can further include providing notifications to a Content Distribution Network (CDN) communicatively coupled to the heterogeneous RAN, instructing the CDN to adjust manifest files based on resource availability in the heterogeneous RAN. Determining whether to upgrade connections and whether to downgrade connections can include determining each channel's availability in the heterogeneous RAN and determining whether a current channel is sufficient for each of the plurality of devices, wherein a channel can include an antenna and a frequency in the heterogeneous RAN, and wherein whether the current channel is sufficient is based on a Service Level Agreement of each device.

In another exemplary embodiment, an apparatus configured to perform orchestration of antennas and frequencies in a heterogeneous Radio Access Network (RAN) includes a network interface communicatively coupled to the heterogeneous RAN; a processor communicatively coupled to the network interface; and memory storing instructions that, when executed, cause the processor to maintain status of a plurality of devices connected to the heterogeneous RAN based on communication through the network interface, determine whether to upgrade connections of a first subset of the plurality of devices, determine whether to downgrade connections of a second subset of the plurality of devices, and provide instructions to the heterogeneous RAN through the network interface for the first subset and the second subset. The apparatus can be one of i) a server executing a Software Defined Networking (SDN) application communicatively coupled to the heterogeneous RAN and ii) a backhaul network element executing a Virtual Networking Function (VNF) communicatively coupled to the heterogeneous RAN. The heterogeneous RAN can include a plurality of towers and cell sites, each with one or more antennas and one or more frequencies, wherein the upgrade connections and the downgrade connections can include a change of one or more of an antenna, a frequency, and an access point in the heterogeneous RAN.

The status can be maintained by obtaining data from the plurality of devices, and one or more of obtaining data from backhaul network elements in the heterogeneous RAN and data from an external database. Each of the plurality of devices initially chooses an antenna, frequency, and access point for accessing the heterogeneous RAN, maintaining compatibility with the heterogeneous RAN, and the upgrade connections and the downgrade connections can be used to rapidly move each of the plurality of devices to an optimal configuration, considering a global view of the heterogeneous RAN. The downgrade connections can be configured to lower or disconnect lower priority devices in favor of higher priority devices, wherein priority is customizable by an operator of the heterogeneous RAN. One of more devices of the plurality of devices can execute an application configured to provide the status and receive and implement the instructions. The memory storing instructions that, when executed, can further cause the processor to provide notifications to a Content Distribution Network (CDN) communicatively coupled to the heterogeneous RAN, instructing the CDN to adjust manifest files based on resource availability in the heterogeneous RAN. The memory storing instructions that, when executed, can further cause the processor to determine the upgrade connections and the downgrade connections, determining each channel's availability in the heterogeneous RAN and determining whether a current channel is sufficient for each of the plurality of devices, wherein a channel can include an antenna and a frequency in the heterogeneous RAN, and wherein whether the current channel is sufficient is based on a Service Level Agreement of each device.

In a further exemplary embodiment, a heterogeneous Radio Access Network (RAN) with an overlaid system configured to perform orchestration of antennas and frequencies includes a plurality of access points each with one or more antennas and one or more frequencies; and a live spectrum analysis system communicatively coupled to the plurality of access points and a plurality of devices communicatively coupled to the plurality of access points, wherein the live spectrum analysis system is configured to maintain status of the plurality of devices connected to the heterogeneous RAN, determine whether to upgrade connections of a first subset of the plurality of devices, determine whether to downgrade connections of a second subset of the plurality of devices, and provide instructions to the heterogeneous RAN for the first subset and the second subset. Each of the plurality of devices initially chooses an antenna, frequency, and access point for accessing the heterogeneous RAN, maintaining compatibility with the heterogeneous RAN, and the upgrade connections and the downgrade connections can be used to rapidly move each of the plurality of devices to an optimal configuration, considering a global view of the heterogeneous RAN.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, the present disclosure relates to systems and methods for SDN orchestration and optimization of antennas and frequencies in heterogeneous RANs. The systems and methods control and optimize bandwidth utilization by next-generation smartphones and other devices in heterogeneous Radio Access Networks (RAN) with spectrum depth, using an SDN system. In an exemplary embodiment, the systems and methods can be implemented as an optional, overlaid complement, but not as a replacement, for the existing telecommunication protocols. The systems and methods can be realized as an SDN application to orchestrate device connections among multiple antennas and multiple frequencies in heterogeneous RAN environment. The systems and methods operate as a load-balancer for a heterogeneous RAN network with spectrum depth, leveraging a global network view that individual devices lack. The systems and methods can access Service Layer Agreement (SLA) and business information to prioritize certain connections.

Heterogeneous Radio Access Network

Figure 1:
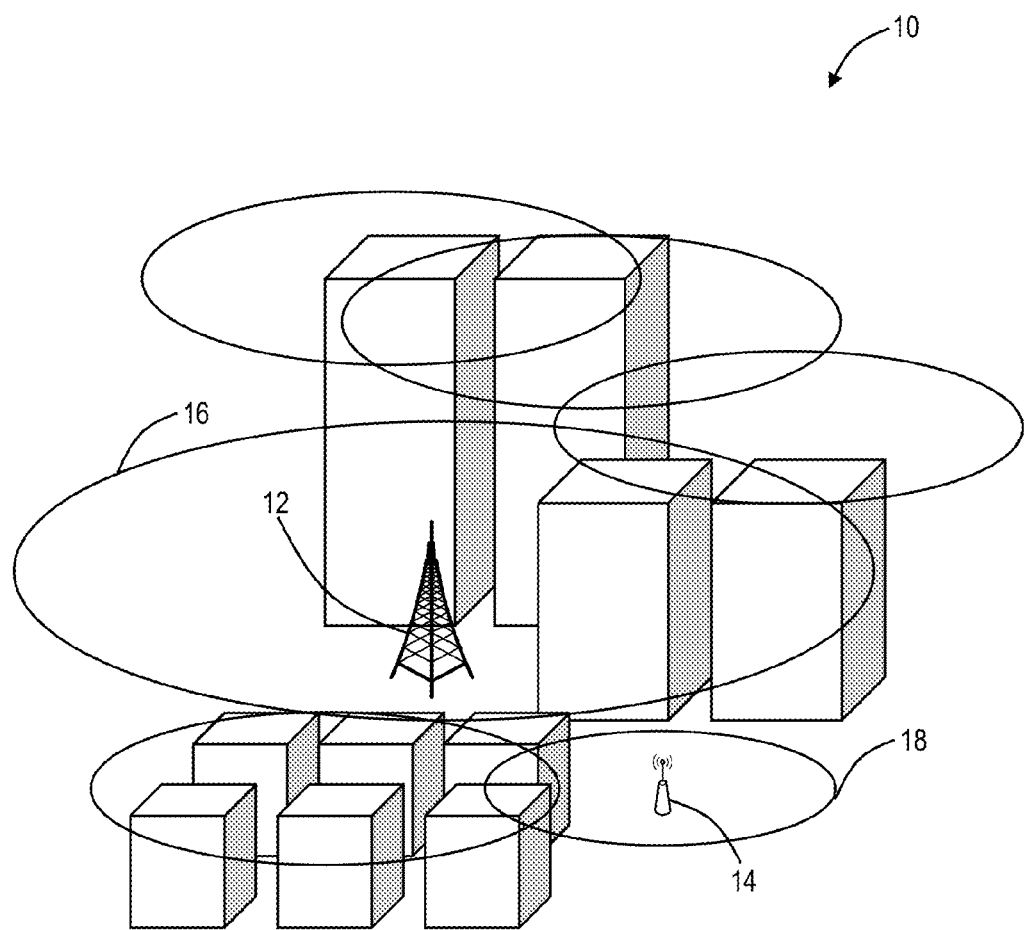
FIG. 1 is a network diagram of an exemplary heterogeneous RAN.

Referring to FIG. 1, in an exemplary embodiment, a network diagram illustrates an exemplary heterogeneous RAN 10. The RAN 10 includes a mixture of access point types, such as, for example, large towers 12 (e.g., a macro cell) which provide wide coverage and capacity and smaller cells 14 (e.g., picocells, femtocells, nanocells, etc.) which have lower power and a denser deployment for in-building coverage or localized coverage. In FIG. 1, the tower 12 has an associated coverage 16, and the small cell 14 has its associated coverage 18. Of course, other components are also contemplated in the RAN 10. Some or all of the antennas associated with the towers 12 and the cells 14 are able to communicate with devices over a variety of frequencies, to increase capacity and performance, and some or all the next-generation mobile devices are also able to communicate through multiple frequencies. This is being referred to as spectrum depth.

Live Spectrum Analysis System

Figure 2:
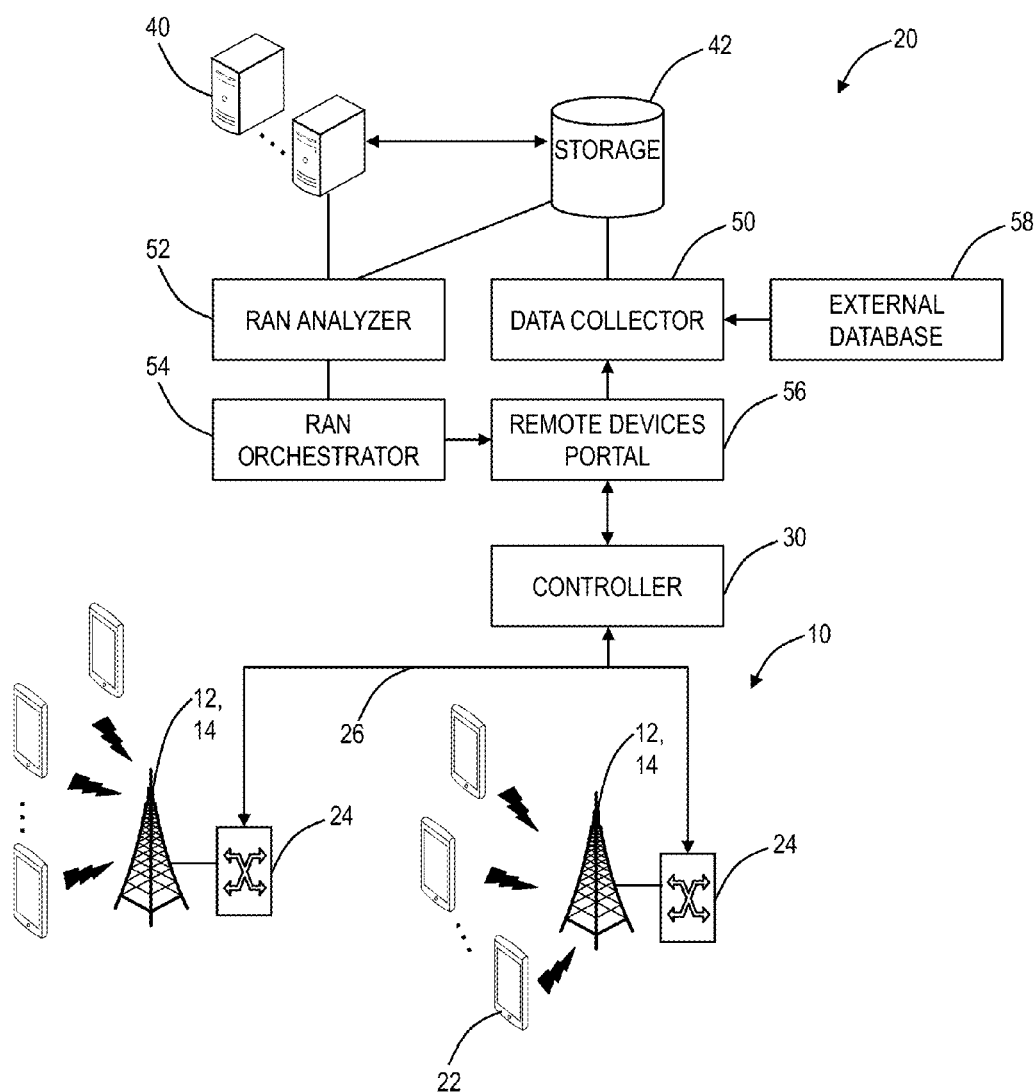
FIG. 2 is a block diagram of a live spectrum analysis system communicatively coupled to a RAN.

Referring to FIG. 2, in an exemplary embodiment, a block diagram illustrates a live spectrum analysis system 20. The live spectrum analysis system 20 is communicatively coupled to the RAN 10. The RAN 10 includes a plurality of mobile devices 22 communicatively coupled to the towers 12 or the cells 14. The RAN 10 also includes backhaul network elements 24 which are configured to provide backhaul connectivity for the RAN 10. Again, the RAN 10 is a heterogeneous RAN with spectrum depth, and with next-generation smartphones (i.e., the devices 22) connected to the RAN 10. The backhaul network elements 24 interface Over-the-Air (OTA) traffic between the devices 22, the towers 12, and the cells 14 with a wired transport network 26. An SDN controller 30 is communicatively coupled to the RAN 10.

In an exemplary embodiment, the live spectrum analysis system 20 is implemented in one or more SDN applications that are communicatively coupled to the SDN controller 30. The one or more SDN applications can be executed on one or more servers 40 which can be communicatively coupled to storage 42. The servers 40 can execute three SDN applications: a data collector 50, a RAN analyzer 52, and a RAN orchestrator 54, running on top of a scalable data storage and data processing backend, i.e., the servers 40 and the storage 42.

If ultra-low latency is required, some of these SDN applications can be deployed as Virtual Networking Functions (VNF) on the backhaul network elements 24. The data collector 50 can communicate with client apps executed on the devices 22, and optionally on antenna backhauls, through a Remote Devices Portal (RDP) 56. Additionally, the data collector 50 can get data from external databases 58 such a Service Provider's customer database providing information about Service Level Agreement (SLA) and business priorities. The collected information can be stored on the server 40 and processed on the fly by the RAN analyzer 52. If the RAN analyzer 52 reaches a non-trivial conclusion, it informs the RAN orchestrator 54 which can send back instructions to devices 22 and/or backhaul network elements 24 as appropriate.

The RAN analyzer 52 consumes a variety of input data, listed in Table 1 below, to monitor the usage of the multiple antennas and frequencies by each connected device 22. Its input data is communicated by the devices 22 and the backhaul network elements 24 via the data collector 50 and the RDP 56. From the devices 22, the inputs are: the identification key of each device 22, the list of antennas visible to each device 22, the list of frequencies usable by each device 22 at each antenna, the signal strength associated with each [smartphone, frequency, antenna] combination, the frequency and antenna currently in use by each device 22, and the download and upload bandwidth currently consumed by each device 22.

From the backhaul network elements 24, the inputs are: the list and the maximal number of frequencies per antenna, the list and the maximal number of encodings per frequency per antenna, and the maximal amount of download and upload bandwidth per frequency per antenna, and optionally the over-booking parameters (see below) per frequency per antenna. All these inputs can be collected in near real-time, and updated approximately every second or the like. Optionally, inputs can also be collected from the external database 58 to provide the Service-Level Agreement (SLA) and the business priority of the customers owning each device 22. Given all this data, the RAN analyzer 52 gets a comprehensive picture of the overall resource usage of the heterogeneous RAN 10 in near real-time.

TABLE 1 list of input data consumed by the RAN Analyzer

| Data input | Source | Update frequency |
| --- | --- | --- |
| Device 22 identification key | Devices 22 | Once per connection |
| Current [frequency, antenna] in use | Devices 22 | Every second |
| List of visible antennas | Devices 22 | Every second |
| List of visible frequencies per antenna | Devices 22 | Every second |
| Signal strength of each [frequency, antenna] | Devices 22 | Every second |
| Current download/upload bandwidth need | Devices 22 | Every second |
| Max no. of encodings per [frequency, antenna] | Backhaul network elements 24 | Once per system update |
| Max download/upload bandwidth per frequency | Backhaul network elements 24 | Once per system update |
| Max download/upload bandwidth per antenna | Backhaul network elements 24 | Once per system update |
| Overbooking parameters of [frequency, antenna] | Backhaul network elements 24 | Once per system update |
| Service-Level Agreement of smartphone user | Customer's business DB | Once per connection |
| Business priority of smartphone user | Customer's business DB | Once per connection |

RAN Analyzer

Figure 3:
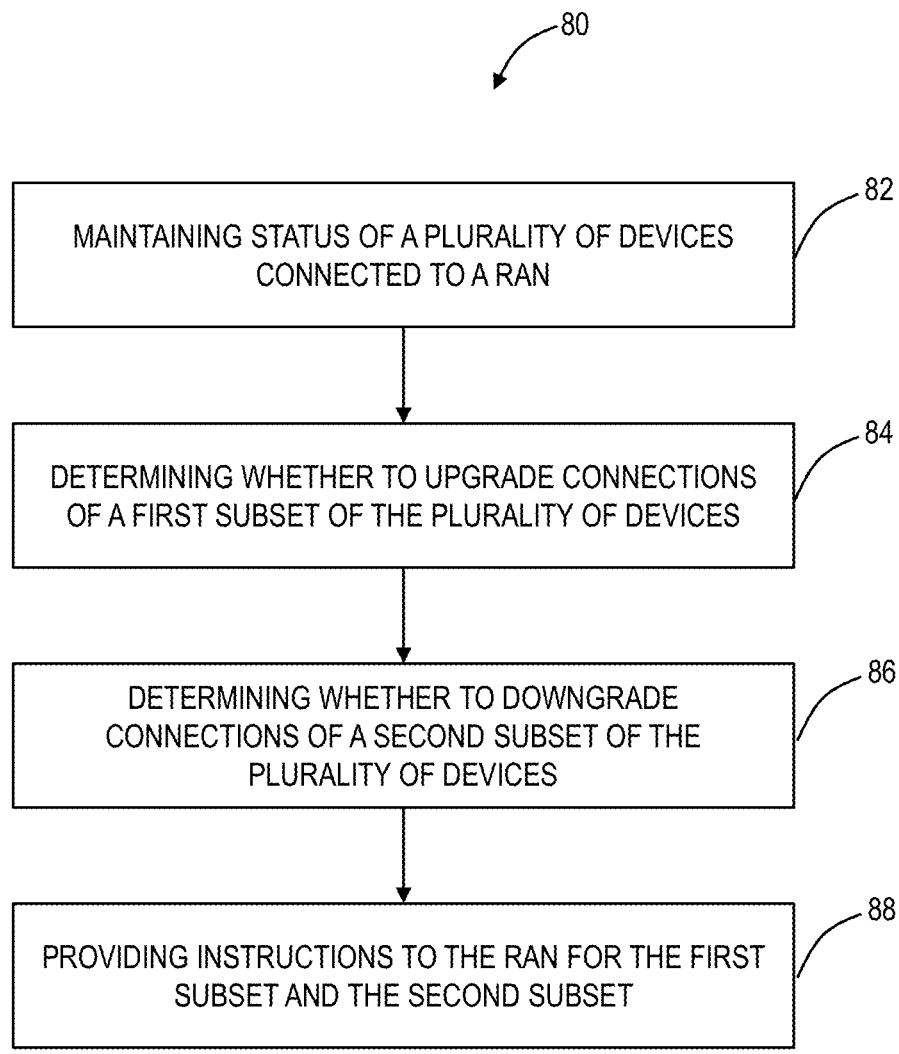
FIG. 3 is a flowchart of a RAN analysis process that can be implemented through the RAN analyzer of live spectrum analysis system of FIG. 2.

Referring to FIG. 3, in an exemplary embodiment, a flowchart illustrates a RAN analysis process 80 that can be implemented through the RAN analyzer 52. The RAN analysis process 80 includes steps for maintaining status of a plurality of devices connected to a RAN, i.e., the devices 22 connected to the RAN 10 (step 82); determining whether to upgrade connections of a first subset of the plurality of devices (step 84); determining whether to downgrade connections of a second subset of the plurality of devices (step 86); and providing instructions to the RAN for the first subset and the second subset (step 88). As described herein, upgrade/downgrade connections mean changing antennas and/or frequencies of a particular device in the RAN.

The RAN analysis process 80 can only consider the devices 22 that already connected to the RAN 10. Hence, the RAN analysis process 80 can operate as a complementary network load balancer, leveraging its global network view that individual devices 22 do not have, but does not replace the existing protocols in place to handle the initial connection and disconnection of devices 22 to the RAN 10.

The guiding principles of the RAN analysis process 80 are: maximize bandwidth available to each device 22, minimize disruption of ongoing connections, and enforce business priority over the allocated bandwidth. To implement this, the RAN analyzer 52 implementing the RAN analysis process 80 has a list of all possible [antenna, frequency] combinations with their over-booking parameters, a list of all active connections, and a sorted list of pointers to connections not currently on their optimal [frequency, antenna]. The list of non-optimal connections is firstly ordered by device 22 priority. When devices 22 have equal priority, they are ranked in chronological order.

To implement the steps 82 of the RAN analysis process 80, network operators associated with the RAN 10 are required to: A) each time a new device 22 connects to the RAN 10, add it to the list of all active connections and to the list of non-optimal connections of the RAN analyzer 52; and B) each time a new device 22 disconnects from the RAN 10, remove it from the list of all active connections and, if need be, from the list of non-optimal connections of the RAN analyzer 52. In addition, network operators must implement two specific functions that are defined for each [frequency, antenna] and for each device: C) is_channel_available(frequency, antenna, device 22), returning a data structure indicating if the channel is available (true or false) and providing a list of devices 22 that would potentially need to be moved ("bumped") to make room to fulfill the request, and D) is_channel_good_enough(frequency, antenna, device 22), returning a data structure indicating if the channel is good enough (true or false) and providing the amount of bandwidth currently available. Finally, network operators have the option to execute is_good_enough( ) at regular time intervals for all connected devices, in order to keep the list of non-optimal connections up to date with respect to recent bandwidth usage by the devices.

By default, both of these functions (is_channel_available( ) and is_channel_good_enough( )) can have a trivial implementation, like always returning positive answers. But network operators have the opportunity to implement these functions with a more customized logic. For instance, is_channel_good_enough( ) could be implemented to verify that the given [frequency, antenna] fulfills the SLA associated to the device 22. The SLAs themselves can be implemented with various levels of granularity. For instance, SLAs could be differentiated between "bronze" vs. "platinum" packages or some other differentiation of service. Similarly, a more refined example of is_channel_available( ) implementation could verify that not all possible encodings are already in use and that sufficient download and/or upload bandwidth is available for the given device 22 requests. Another implementation could do the same, but only accept devices 22 with a "platinum" SLA. Or an even more refined implementation could distinguish between three cases: "green" when less than 80% of the total bandwidth is being used and any device 22 can connect, "yellow" when more than 80% of the total bandwidth is being used and only devices 22 with "platinum" SLA can connect, and "red" when all the available bandwidth is being used and no more devices 22 can connect unless their priority is higher than an already-connected device 22, in which case the high-priority device 22 would be accepted, and the lowest priority device 22 would be moved to a different [frequency, antenna].

Those of ordinary skill in the art will recognize many more implementations of is_channel_available( ) and is_channel_good_enough( ) are possible. Finally, it should be noted that different [frequency, antenna] combinations can be associated to different implementations of is_channel_available( ). For instance, one frequency can be operated with a "platinum-SLA only" implementation and another can be operated with an "accept everybody" implementation. Here again, many more configurations are possible.

Figure 4:
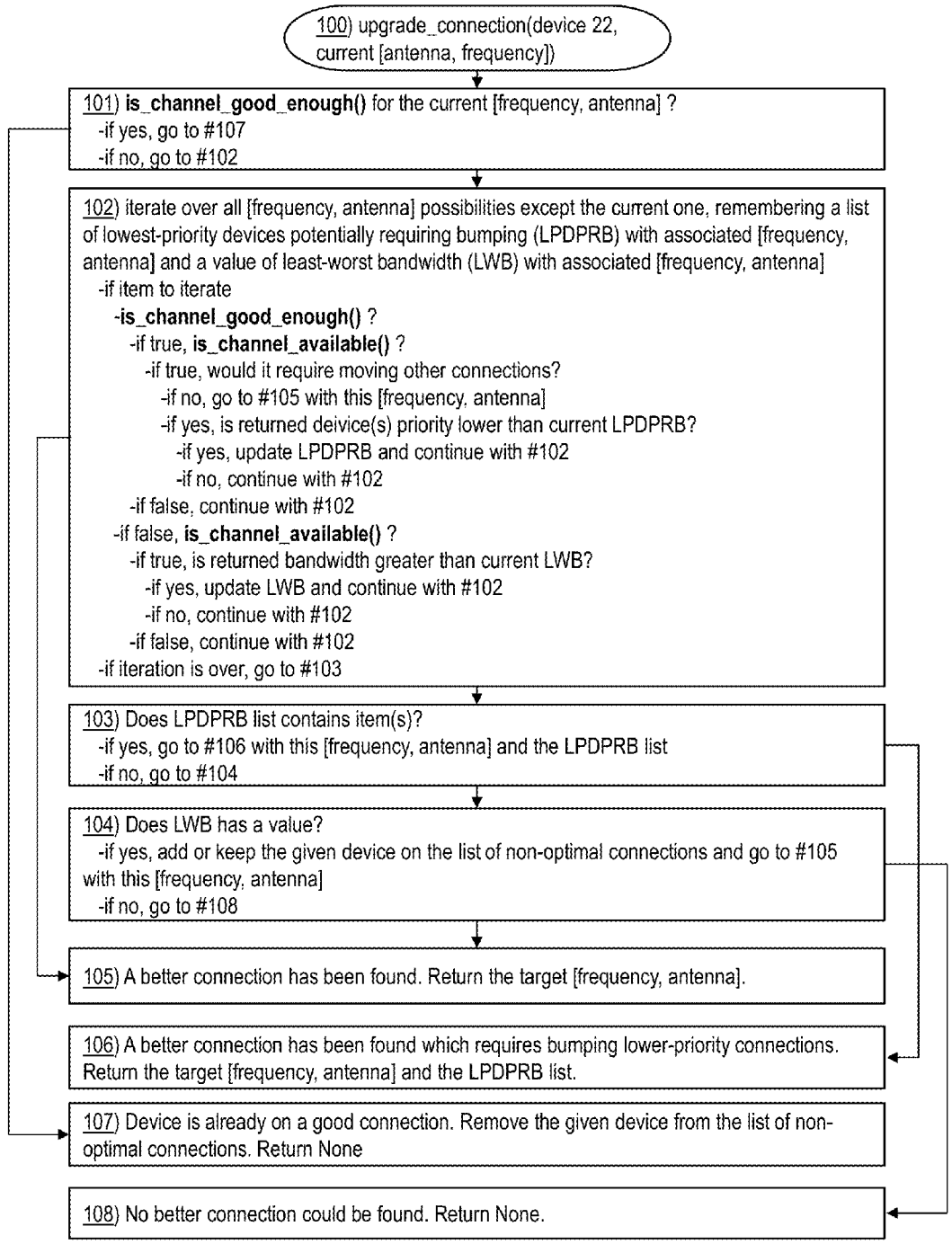
FIG. 4 is a flowchart of a process to upgrade connections, for implementing a step in the RAN analysis process of FIG. 3.

Referring to FIG. 4, in an exemplary embodiment, a flowchart illustrates a process 100 to upgrade connections, for implementing step 84 in the RAN analysis process 80. Specifically, the process 100 can be a function labeled upgrade_connection(device 22, current [antenna, frequency]), whose inputs are the devices 22 and its current antenna and frequency and whose logic is shown in FIG. 4. The process 100 is performed over a list of devices 22 on the RAN 10. A call to the process 100 can be expressed as upgrade_connection(device 22, current [antenna, frequency]). First, for a given device 22, the process 100 checks is_channel_good_enough( ) for the current [frequency, antenna] associated with the given device (step 101). If is_channel_good_enough( ) is YES, the process 100 goes to step 107 and if is_channel_good_enough( ) is NO, the process goes to step 102.

In step 102, there is an iteration over all [frequency, antenna] possibilities except the current one, remembering a list of lowest-priority devices potentially requiring bumping (LPDPRB) with associated [frequency, antenna] and a value of least-worst bandwidth (LWB) with associated [frequency, antenna], and the iteration includes:

```
-if item to iterate
    -is_channel_good_enough( ) ?
        -if true, is_channel_available( ) ?
            -if true, would it require moving other connections?
                -if no, go to step 105 with this [frequency, antenna]
                -if yes, is returned device(s) priority lower than current
                    LPDPRB?
                    -if yes, update LPDPRB and continue with step 102
                    -if no, continue with step 102
            -if false, continue with step 102
        -if false, is_channel_available( ) ?
            -if true, is returned bandwidth greater than current LWB?
                -if yes, update LWB and continue with step 102
                -if no, continue with step 102
            -if false, continue with step 102
-if iteration is over, go to step 103
```

In step 103, the process 100 includes checking if the LPDPRB list contains item(s) and if YES, the process 100 goes to step 106 with this [frequency, antenna] and the LPDPRB list, and if NO, the process 100 goes to step 104.

In step 104, the process 100 includes checking if the LWB has a value, and if YES, adds or keep the given devices on the list of non-optimal connections and goes to step 105 with this [frequency, antenna], and if NO, the process goes to step 108.

In step 105, a better connection has been found, and the process 100 returns the target [frequency, antenna].

In step 106, a better connection has been found which requires bumping lower-priority connections and the process 100 can return the target [frequency, antenna] and the LPDPRB list.

In step 107, the device is already on a good connection, and the process 100 includes removing the given device from the list of non-optimal connections and returning none for the given device.

Finally, in step 108, no better connection could be found, and the process 100 includes returning none for the given device.

Figure 5:
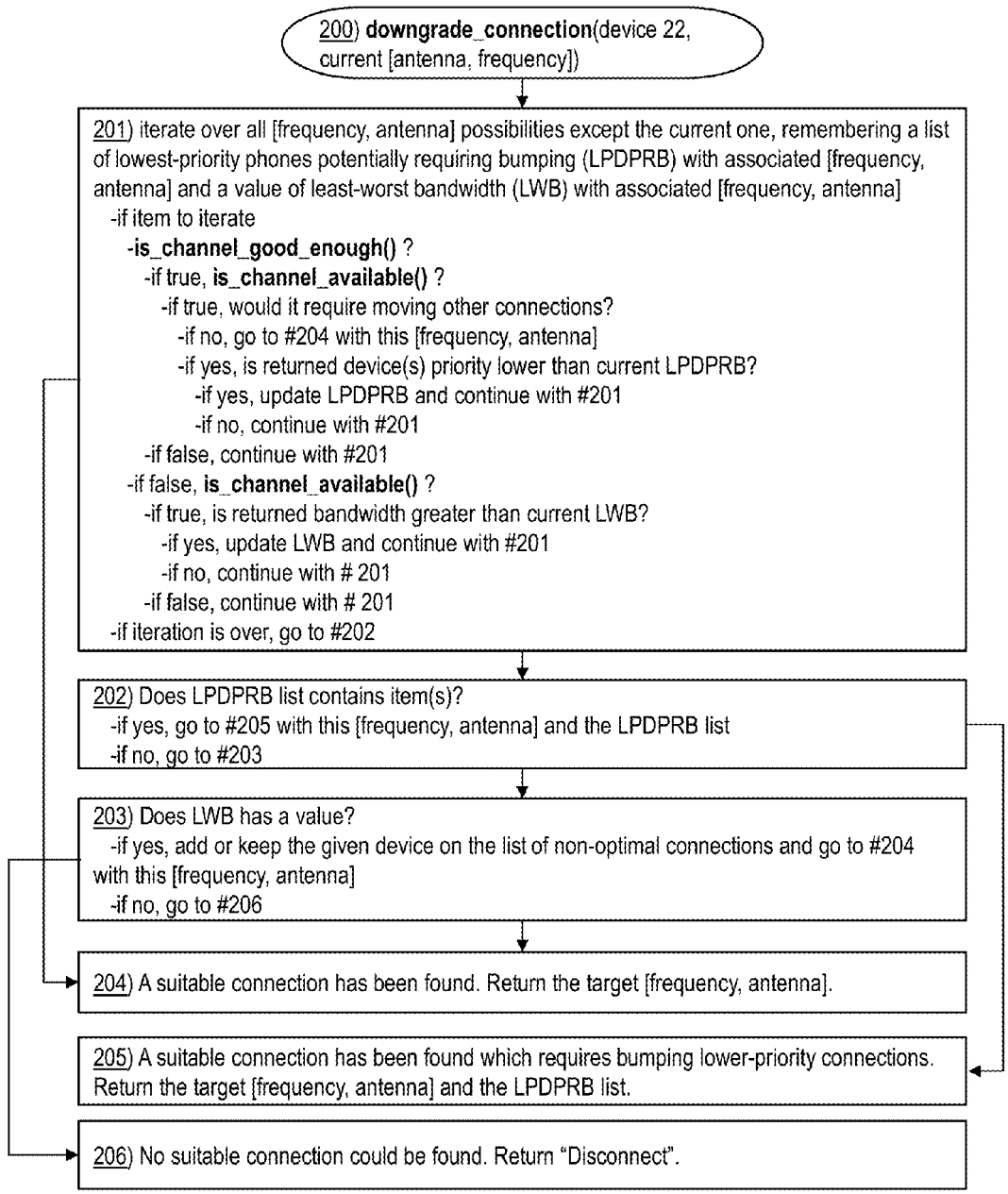
FIG. 5 is a flowchart of a process to downgrade connections, for implementing a step in the RAN analysis process of FIG. 3.

Referring to FIG. 5, in an exemplary embodiment, a flowchart illustrates a process 200 to downgrade connections, for implementing step 86 in the RAN analysis process 80. When the process 100 (upgrade_connection( )) returns a LPDPRB list, the downgrade_connection( ) algorithm can be executed for each element of that list, i.e., step 86. A call to the process 200 can be expressed as downgrade_connection(device 22, current [antenna, frequency]).

The process 200 for step 101 includes an iteration over all [frequency, antenna] possibilities except the current one, remembering a list of lowest-priority devices potentially requiring bumping (LPDPRB) with associated [frequency, antenna] and a value of least-worst bandwidth (LWB) with associated [frequency, antenna], and the iteration includes:

```
-if item to iterate
   -is_channel_good_enough( ) ?
      -if true, is_channel_available( ) ?
         -if true, would it require moving other connections?
            -if no, go to step 204 with this [frequency, antenna]
            -if yes, is returned device(s) priority lower than current
            LPDPRB?
               -if yes, update LPDPRB and continue with step 201
               -if no, continue with step 201
         -if false, continue with step 201
      -if false, is_channel_available( ) ?
         -if true, is returned bandwidth greater than current LWB?
            -if yes, update LWB and continue with step 201
            -if no, continue with step 201
         -if false, continue with step 201
-if iteration is over, go to step 202
```

In step 202, the process 200 checks if the LPDPRB list contains item(s), and if YES, the process 200 goes to step 205 with this [frequency, antenna] and the LPDPRB list, and if NO, the process 200 goes to step 203.

In step 203, the process 200 checks if LWB has a value, and if YES, the process 200 adds or keeps the given device on the list of non-optimal connections and goes to step 204 with this [frequency, antenna], and if NO, the process 200 goes to step 206.

In step 204, a suitable connection has been found, and the process 200 returns the target [frequency, antenna].

In step 205, a suitable connection has been found which requires bumping lower-priority connections and the process 200 returns the target [frequency, antenna] and the LPDPRB list.

In step 206, no suitable connection could be found, and the process 200 returns "Disconnect".

The upgrade_connection( ) algorithm, i.e., the process 100, can be executed at regular intervals for each element of the (ordered) list of non-optimal connections. The duration of that interval is typically of 1-10 seconds, which can be adjusted by the network operator. As explained above, this can also trigger the execution of downgrade_connection( ), i.e., the process 200. After each execution, the suggestions of the RAN analyzer 52 are communicated to the RAN orchestrator 54 that is responsible for taking actions, such as for performing step 88.

The RAN analyzer 52 may not be responsible for moving or disconnecting devices 22 by itself. Instead, these instructions can be undertaken by the RAN orchestrator 54. The RAN orchestrator 54 can communicate instructions down to the devices 22 via the RDP 56. These instructions can be received by the client application running on the devices 22. Then they are turned into actual commands to the device 22 via a phone-specific plugin of the client app. To achieve that, the RAN orchestrator 54 can implement three functions: move_connection( ), disconnect( ) and send_notification( ).

The move_connection( ) function can be expressed as move_connection(device 22, current [antenna, frequency], target [antenna, frequency]), and is responsible for connecting the given device to new channel and disconnecting from the old channel in a hitless way, and responsible for updating the inventory of available resources for both the old and the new [frequency, antenna] combinations.

The disconnect( ) function can be expressed as disconnect (device 22, current [antenna, frequency]), and is responsible for disconnecting the given device 22 from the given channel and for updating the inventory of available resources accordingly.

The send_notification( ) function can be expressed as send_notification(distributor, resource inventory [antennas, frequencies], cell information). The notification is sent whenever there is a change in resource inventory. For example, a Content Distribution Network (CDN) distributor could subscribe to the RAN orchestrator 54 for notification. The distributor then can adjust the manifest files at an edge server feeding into the cell coverage area. For example, a current manifest file has adaptive bit rate streaming of: 720p (HD), 480p, 360p, 240p, or 144p. The intent is that when devices 22 streaming 720p begin to experience congestion, they will try 480p (the next level down) without using the systems and methods described herein. When at 480p and congestion is experienced, they will try 360p (the next level down).

With the systems and methods described herein, the CDN distributor might want to adjust proactively the manifest to fit the resource inventory information. For instance, it could become: 360p and 144p. Hence, the CDN distributor can proactively adjust the "best" experience for all users by directly going down to 360p. Similarly, when the resource inventory significantly improves, the manifest could be adjusted to 720p and 480p. This type of CDN distributor control is especially importing with streaming 4K/8K becomes common.

Thus, the live spectrum analysis system 20 and the process 80 collect data and orchestrate device 22 connectivity in the heterogeneous RAN 10 with spectral depth. The system 20 and the process 80 has great flexibility to adapt to diverse network configurations and support a plurality of features ranging from operational considerations to monetization and end-customer experience. In particular, network operators will have freedom to decide how to specifically implement the following pieces: is_channel_available(frequency, antenna, device) method, which can implemented uniformly for all channels or differently channel-by-channel; is_channel_good_enough(frequency, antenna, device) method, which can be implemented uniformly for all connections, or by SLA categories ("bronze", "platinum", . . . ) or differently device-by-device; number of different frequencies and antennas per geographical regions; configuration of co-existing frequencies and antennas with respect to is_channel_available( ) and who is allowed to connect; and the like.

The system 20 and the process 80 gives network operators freedom to choose how to implement the is_channel_available( ) and is_channel_good_enough( ) for their specific networks. The choice of the best implementation notably depends on the specific configuration of the multiple frequencies and antennas in the geographical area covered by the RAN 10. And here again, network operators have some "freedom" in how they decide to deploy the antennas and frequencies in their networks. Finally, these implementation choices (e.g., gold vs. bronze SLAs, etc.) also depend on the expected usage patterns of the networks and on the business models of the network operators.

If the above problem was to be optimized for a specific case, a network operator would need to build an optimization model that would include adjustable (or "free") parameters whose values would be determined by the optimization procedure itself. Choosing the best value of each of these free parameters is subject to an optimization procedure.

By collecting all the relevant input data in real-time and bringing it all together in a centralized manner, the system 20 and the process 80 enable to operate the RAN 10 in a deterministic way under all circumstances. The system 20 and the process 80 provide Big Data Analytics tools to manage the complexity and leverage the power of the heterogeneous RAN 10 with spectral depth. In particular, the RAN analyzer 52 acts as a load-balancer for the RAN 10, leveraging its global view that individual devices 22 do not have. In addition, the system 20 and the process 80 has enough flexibility to adapt to diverse network configurations, support a plurality of features, and opens the door for subsequent optimization that could lead to super-linear increase of the effective network capacity.

Again, the heterogeneous RAN 10 with spectrum depth of the future will be capable of supporting multiple frequencies and antennas in a same geographical area. The required infrastructure will be developed by major network operators. For the system 20 and the process 80, the initial choice of antenna can be left to individual device 22, for sake of compatibility with existing telecommunication protocols, but the RAN analyzer 52 and the RAN orchestrator 54 will rapidly move the connection to the best antenna, as defined by considering the global network traffic and the network operator's business logic. Also, the initial choice of frequency can be left to individual device 22, for sake of compatibility with existing telecommunication protocols, but the RAN analyzer 52 and the RAN orchestrator 54 will rapidly move the connection to the best frequency, as defined by considering the global network traffic and the network operator's business logic. By design, the RAN analyzer 52 knows about all connections in the RAN 10 and guarantees that higher-priority connections can always "bump" lower-priority ones. Furthermore, it allows to configure the "bumping" logic independently for each [antenna, frequency] combination. Hence, the resulting network behavior is fully predictable, and even optimal, in all circumstances.

SDN Environment

Figure 6:
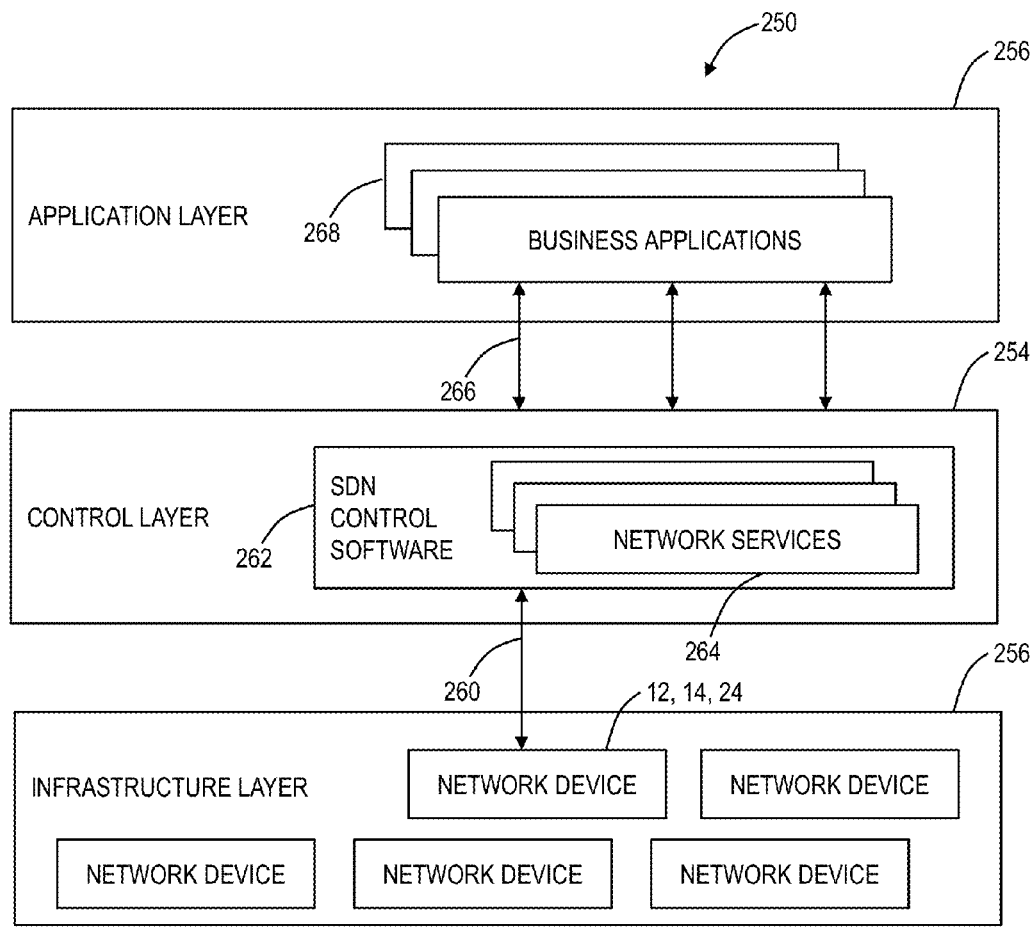
FIG. 6 is a block diagram of functional components of an SDN environment.

Referring to FIG. 6, in an exemplary embodiment, a block diagram illustrates functional components of an SDN environment 250. Again, as described herein, in an exemplary embodiment, the controller 30 can be an SDN controller which operates in the SDN environment 250. The SDN environment 250 includes a programmable infrastructure layer 252, a control layer 254, and an application layer 256. The programmable infrastructure layer 252 includes network devices such as the towers 12, the cells 14, the network elements 24, and other components in the RAN 10 and is communicatively coupled to the control layer 254 via a control plane interface 260 such as OpenFlow, for example. The control layer 254 facilitates communication between the application layer 256 and the network devices located in programmable infrastructure layer 252. The control layer 254 includes SDN control software 262 with a plurality of network services 264. The control layer 254 provides SDN functionality to manage network services through the abstraction of lower level functionality. The application layer 256 communicates with the control layer 254 through various Application Programming Interfaces (APIs) 266. The application layer 256 provides end user connectivity to the SDN such as software modules and/or functions responsible for creating the desired path and flow connections on the physical network through various business applications 268.

In an exemplary embodiment, the systems and methods described herein are implemented as one of the business applications 268 on the SDN environment 250 and/or on a separate server. In the context of the systems and methods described herein, the SDN environment 250 and associated applications thereon are continually monitoring Operations, Administration, Monitoring (OAM) and performance monitoring data over time in the RAN 10. The systems and methods take advantage of the SDN paradigm to access relevant network data through open Application Programming Interfaces (APIs) such as associated with the SDN environment 250. In addition to accessing the network data, the controller 30 can also access data from the database 58 via their APIs.

SDN Controller/Server for the Application

Figure 7:
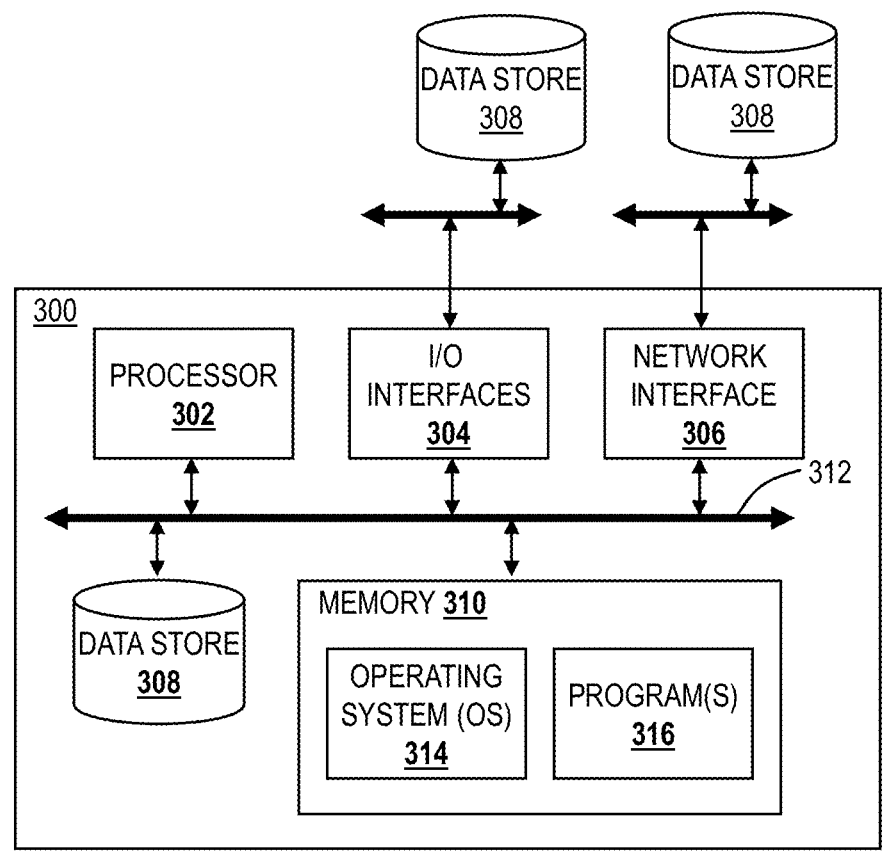
FIG. 7 is a block diagram of a server such as for the servers and the controller in the live spectrum analysis system of FIG. 2.

Referring to FIG. 7, in an exemplary embodiment, a block diagram illustrates a server 300 such as for the controller 30 and/or the servers 40. The server 300 can be a digital computer that, in terms of hardware architecture, generally includes a processor 302, input/output (I/O) interfaces 304, a network interface 306, a data store 308, and memory 910. It should be appreciated by those of ordinary skill in the art that FIG. 8 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 can include address, control, and/or data connections to enable appropriate communications among the aforementioned components.

The processor 302 is a hardware device for executing software instructions. The processor 302 can be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 can be used to receive user input from and/or for providing system output to one or more devices or components. User input can be provided via, for example, a keyboard, touchpad, and/or a mouse. System output can be provided via a display device and a printer (not shown). I/O interfaces 304 can include, for example, a serial port, a parallel port, a small computer system interface (SCSI), a serial ATA (SATA), a fiber channel, Infiniband, iSCSI, a PCI Express interface (PCI-x), an infrared (IR) interface, a radio frequency (RF) interface, and/or a universal serial bus (USB) interface.

The network interface 306 can be used to enable the server 300 to communicate on a network. The network interface 306 can include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 can include address, control, and/or data connections to enable appropriate communications on the network. A data store 308 can be used to store data. The data store 308 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 can incorporate electronic, magnetic, optical, and/or other types of storage media. In one example, the data store 308 can be located internal to the server 300 such as, for example, an internal hard drive connected to the local interface 312 in the server 300. Additionally in another embodiment, the data store 308 can be located external to the server 300 such as, for example, an external hard drive connected to the I/O interfaces 304 (e.g., SCSI or USB connection). In a further embodiment, the data store 308 can be connected to the server 300 through a network, such as, for example, a network attached file server.

The memory 310 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 can incorporate electronic, magnetic, optical, and/or other types of storage media. Note that the memory 310 can have a distributed architecture, where various components are situated remotely from one another, but can be accessed by the processor 302. The software in memory 310 can include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

In an exemplary embodiment, the controller 30 can be implemented through the server 300 where the network interface 308 is communicatively coupled to one or more nodes in a network. The controller 30 can also include an Application Programming Interface (API) which allows additional applications to interface with the SDN controller for data associated with the network. In an exemplary embodiment, one or more applications, such as the data collector 50, the RAN analyzer 52, the RAN orchestrator 54, the RDP 56, etc., can be implemented on the server 300 (or on the server 300 operating as the SDN controller 30) for the SDN control plane, and receive data through the API. Other configurations are also contemplated.

It will be appreciated that some exemplary embodiments described herein may include one or more generic or specialized processors ("one or more processors") such as microprocessors, digital signal processors, graphics processing units (GPUs), customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for orchestration of antennas and frequencies in a heterogeneous Radio Access Network (RAN), the method comprising:
   maintaining status of a plurality of devices connected to the heterogeneous RAN to determine a real-time global view of the heterogeneous RAN based on the plurality of devices, associated bandwidth, and antenna usage;
   determining whether to upgrade connections of a first subset of the plurality of devices;
   determining whether to downgrade connections of a second subset of the plurality of devices, wherein each device of the plurality of devices initially connects to the heterogenous RAN based on a choice by that device, and wherein the determining steps perform load balancing of the heterogenous RAN based on the real-time global view that each of the plurality of devices lack individually; and
   providing instructions to the heterogeneous RAN for the first subset and the second subset,
   wherein the determining whether to upgrade connections and whether to downgrade connections comprises determining each channel's availability in the heterogeneous RAN and determining whether a current channel is sufficient for each of the plurality of devices, wherein a channel is formed by an antenna at a frequency in the heterogeneous RAN, wherein whether the current channel is sufficient is based on a Service Level Agreement (SLA) associated with each device defining a level of service in the RAN of a plurality of levels, and wherein determining each channel's availability utilizes the SLA to determine which level of the plurality of levels can connect.

2. The method of claim 1, wherein the method is implemented in one of i) a Software Defined Networking (SDN) application executed on one or more servers communicatively coupled to the heterogeneous RAN and ii) a Virtual Networking Function (VNF) executed on a backhaul network element communicatively coupled to the heterogeneous RAN.

3. The method of claim 1, wherein the heterogeneous RAN comprises a plurality of towers and cell sites, each with one or more antennas and one or more frequencies, wherein the upgrade connections and the downgrade connections comprise a change of one or more of an antenna, a frequency, and an access point in the heterogeneous RAN.

4. The method of claim 1, wherein the maintaining the status comprises obtaining data from the plurality of devices, and one or more of obtaining data from backhaul network elements in the heterogeneous RAN and data from an external database.

5. The method of claim 1, wherein each of the plurality of devices initially chooses an antenna, frequency, and access point for accessing the heterogeneous RAN, maintaining compatibility with the heterogeneous RAN, and the upgrade connections and the downgrade connections is used to rapidly move each of the plurality of devices to an optimal configuration.

6. The method of claim 1, wherein the downgrade connections is configured to lower or disconnect lower priority devices in favor of higher priority devices, wherein priority is customizable by an operator of the heterogeneous RAN.

7. The method of claim 1, wherein one of more devices of the plurality of devices execute an application configured to provide the status and receive and implement the instructions.

8. The method of claim 1, further comprising:
providing notifications to a Content Distribution Network (CDN) communicatively coupled to the heterogeneous RAN, instructing the CDN to adjust manifest files based on resource availability in the heterogeneous RAN.

9. An apparatus configured to perform orchestration of antennas and frequencies in a heterogeneous Radio Access Network (RAN), the apparatus comprising:
a network interface communicatively coupled to the heterogeneous RAN;
a processor communicatively coupled to the network interface; and
memory storing instructions that, when executed, cause the processor to
maintain status of a plurality of devices connected to the heterogeneous RAN based on communication through the network interface to determine a real-time global view of the heterogeneous RAN based on the plurality of devices, associated bandwidth, and antenna usage,
determine whether to upgrade connections of a first subset of the plurality of devices,
determine whether to downgrade connections of a second subset of the plurality of devices, wherein to determine whether to upgrade connections and to determine whether to downgrade connections comprises a determination of each channel's availability in the heterogeneous RAN and a determination whether a current channel is sufficient for each of the plurality of devices, wherein a channel is formed by an antenna at a frequency in the heterogeneous RAN, and wherein whether the current channel is sufficient is based on a Service Level Agreement (SLA) associated with each device defining a level of service in the RAN of a plurality of levels, and wherein determining each channel's availability utilizes the SLA to determine which level of the plurality of levels can connect, and
provide instructions to the heterogeneous RAN through the network interface for the first subset and the second subset;
wherein each device of the plurality of devices initially connects to the heterogenous RAN based on a choice by that device, and wherein the determining steps perform load balancing of the heterogenous RAN based on the real-time global view that each of the plurality of devices lack individually.

10. The apparatus of claim 9, wherein the apparatus is one of i) a server executing a Software Defined Networking (SDN) application communicatively coupled to the heterogeneous RAN and ii) a backhaul network element executing a Virtual Networking Function (VNF) communicatively coupled to the heterogeneous RAN.

11. The apparatus of claim 9, wherein the heterogeneous RAN comprises a plurality of towers and cell sites, each with one or more antennas and one or more frequencies, wherein the upgrade connections and the downgrade connections comprise a change of one or more of an antenna, a frequency, and an access point in the heterogeneous RAN.

12. The apparatus of claim 9, wherein the status is maintained by obtaining data from the plurality of devices, and one or more of obtaining data from backhaul network elements in the heterogeneous RAN and data from an external database.

13. The apparatus of claim 9, wherein each of the plurality of devices initially chooses an antenna, frequency, and access point for accessing the heterogeneous RAN, maintaining compatibility with the heterogeneous RAN, and the upgrade connections and the downgrade connections is used to rapidly move each of the plurality of devices to an optimal configuration.

14. The apparatus of claim 9, wherein the downgrade connections is configured to lower or disconnect lower priority devices in favor of higher priority devices, wherein priority is customizable by an operator of the heterogeneous RAN.

15. The apparatus of claim 9, wherein one of more devices of the plurality of devices execute an application configured to provide the status and receive and implement the instructions.

16. The apparatus of claim 9, wherein the memory storing instructions that, when executed, further cause the processor to
provide notifications to a Content Distribution Network (CDN) communicatively coupled to the heterogeneous RAN, instructing the CDN to adjust manifest files based on resource availability in the heterogeneous RAN.

17. A heterogeneous Radio Access Network (RAN) with an overlaid system configured to perform orchestration of antennas and frequencies, the heterogeneous RAN comprising:
a plurality of access points each with one or more antennas and one or more frequencies; and
a live spectrum analysis system communicatively coupled to the plurality of access points and a plurality of devices communicatively coupled to the plurality of access points, wherein the live spectrum analysis system is configured to
maintain status of the plurality of devices connected to the heterogeneous RAN to determine a real-time global view of the heterogeneous RAN based on the plurality of devices, associated bandwidth, and antenna usage,
determine whether to upgrade connections of a first subset of the plurality of devices,
determine whether to downgrade connections of a second subset of the plurality of devices, wherein to determine whether to upgrade connections and to determine whether to downgrade connections comprises a determination of each channel's availability in the heterogeneous RAN and a determination whether a current channel is sufficient for each of the plurality of devices, wherein a channel is formed by an antenna at a frequency in the heterogeneous RAN, and wherein whether the current channel is sufficient is based on a Service Level Agreement (SLA) associated with each device defining a level of service in the RAN of a plurality of levels, and wherein determining each channel's availability utilizes the SLA to determine which level of the plurality of levels can connect, and provide instructions to the heterogeneous RAN for the first subset and the second subset;

wherein each device of the plurality of devices initially connects to the heterogenous RAN based on a choice by that device, and wherein the determining steps perform load balancing of the heterogenous RAN based on the real-time global view that each of the plurality of devices lack individually.

18. The heterogeneous RAN of claim 17, wherein each of the plurality of devices initially chooses an antenna, frequency, and access point for accessing the heterogeneous RAN, maintaining compatibility with the heterogeneous RAN, and the upgrade connections and the downgrade connections is used to rapidly move each of the plurality of devices to an optimal configuration, considering a global view of the heterogeneous RAN.

\* \* \* \* \*

UNITED STATES PATENT AND TRADEMARK OFFICE
CERTIFICATE OF CORRECTION

PATENT NO. : 9,924,392 B2  Page 1 of 1
APPLICATION NO. : 14/859642
DATED : March 20, 2018
INVENTOR(S) : David Côté et al.

It is certified that error appears in the above-identified patent and that said Letters Patent is hereby corrected as shown below:

On the Title Page

Item (73) for the Assignee delete "Cienna" and insert --Ciena-- Corporation, Hanover, MD (US)

Signed and Sealed this
First Day of May, 2018

Andrei Iancu
*Director of the United States Patent and Trademark Office*